May 29, 1962 E. C. SIGGELKOW 3,036,791

TAPE OR CHALK LINE WITH MAGNETIC HOLDER

Filed Feb. 10, 1960 2 Sheets-Sheet 1

Evan C. Siggelkow
INVENTOR.

BY Clarence A. O'Brien
and Harvey B. Jacobson
Attorneys

TAPE OR CHALK LINE WITH MAGNETIC HOLDER

Filed Feb. 10, 1960 2 Sheets-Sheet 2

Evan C. Siggelkow
INVENTOR.

BY Clarence A. O'Brien
and Harvey B. Jacobson
Attorneys 3,036,791

TAPE OR CHALK LINE WITH MAGNETIC HOLDER

Evan C. Siggelkow, 4432 Chinden Blvd., Boise, Idaho, assignor of fifty percent to Hal P. Kibbey, Boise, Idaho Filed Feb. 10, 1960, Ser. No. 7,945
5 Claims. (Cl. 242—107)

This invention relates to measuring tapes and/or chalk lines and more particularly to holding devices for tapes and chalk lines.

An object of the invention is to provide a tape or chalk line or any other elongate analogous device or instrument with an easily used holding device enabling the chalk line, tape or the like to be used by one person, whereas it would ordinarily require two people to perform a number of operations with tapes or lines.

Briefly, the invention is embodied in magnetic holder or holders secured to the casing of the chalk line or measuring tape whereby the casing may be fixed to a magnetizable object e.g., a metal post, beam, etc., and the other end held by the user so as to operate the chalk line or take a measurement whatever the case may be.

Although the invention contemplates magnetic holding devices or a single magnetic holding device on the casing of the line or tape, it is an equally important feature of the invention to equip the outer end of the line or tape with a magnetic holder so that the free end may optionally be held fastened to a magnetizable object.

Further, even though special chalk line structures and measuring tape structures may be developed, the invention is equally well adaptable for special types of tapes and/or chalk lines as commercially available lines and tapes. All that is required is to attach a magnet to the chalk line or magnetic tape casing and/or the free end of either or both.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
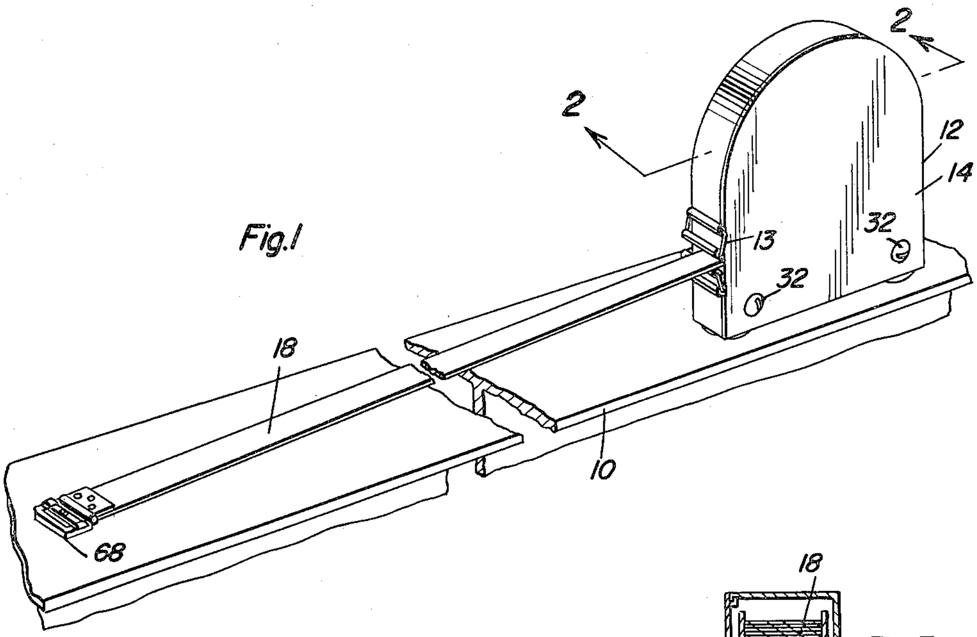
FIGURE 1 is a perspective view of a tape having magnetic holders in accordance with the invention.

In the accompanying drawings reference is first made to FIGURES 1–3 and 8. Structural steel 10 is disclosed in FIGURE 1, and there is a measuring tape 12 attached thereto. The measuring tape is made of a housing 14 having tape guides 13 near an opening 16 at one side thereof through which the flexible elongate element 18 extends.

Figure 2:
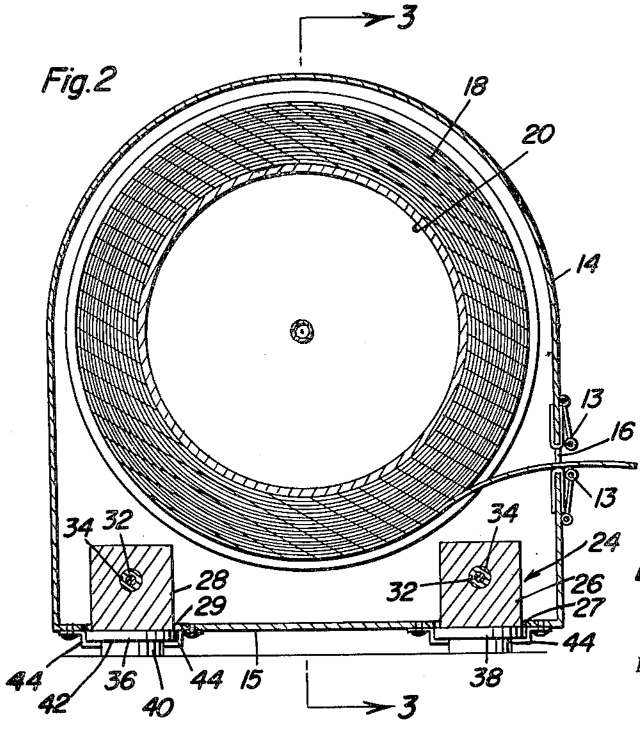
FIGURE 2 is a sectional view taken on the line 2—2 of FIGURE 1.
Figure 3:
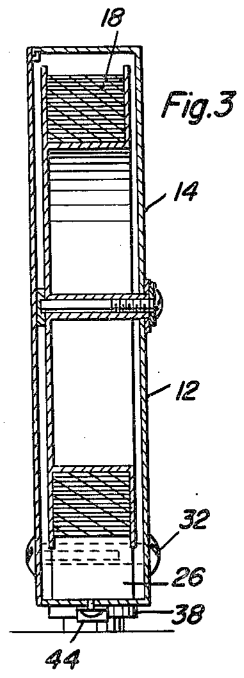
FIGURE 3 is a sectional view taken on the line 3—3 of FIGURE 2.
Figures 4, 6, 8:
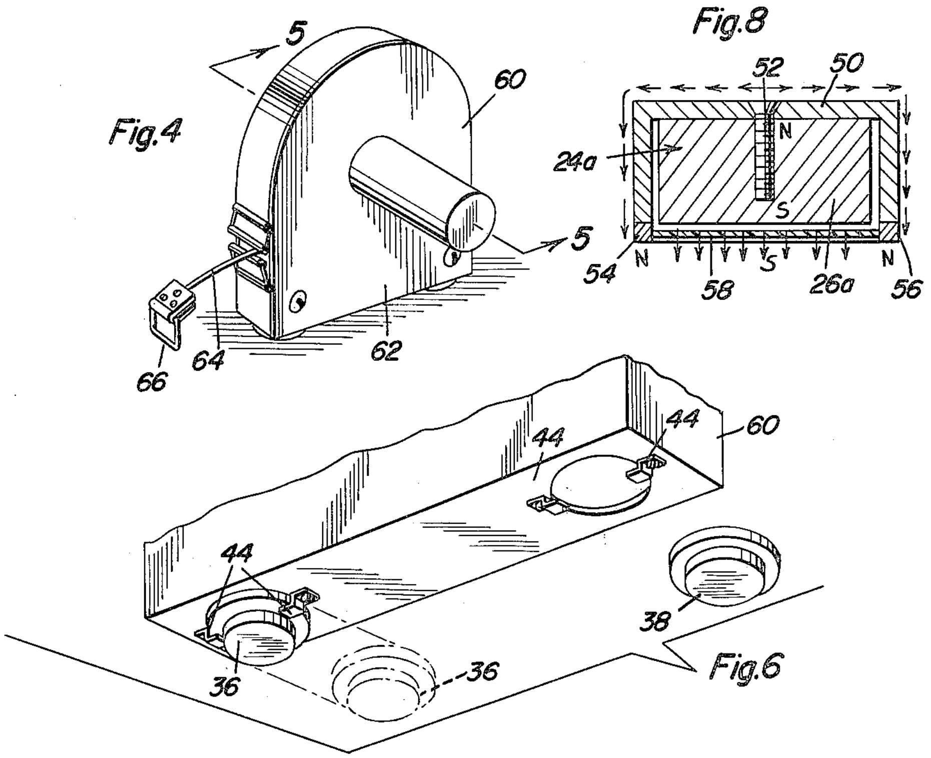
FIGURE 4 is a perspective view of a chalk line equipped with a magnetic holder in accordance with the invention.
FIGURE 6 is a fragmentary bottom perspective view of the chalk line of FIGURE 4.
FIGURE 8 is a sectional view showing the modification of the magnet assembly which may be used with either FIGURE 1 or FIGURE 4.

FIGURE 2 shows element 18 mounted on a drum 20, this being but one particular type of tape which is commercially available. Structurally, housing 14, element 18, and the functional utility of both are conventional. Accordingly, various different types of tapes may benefit by the principles of the invention, it being understood that tapes of different lengths can be used and that the tapes may be selected from the available group of tapes which would include steel tapes, cloth tapes, etc., and of any length and of any type of usual construction using spring retraction, manual wind retraction and others.

The typical tape 12 is improved by magnetic holder 24 (FIGURE 2) which is made of two bar magnets 26 and 28 disposed within housing 14 and on the lower wall 15 thereof. The bar magnets are set with the poles of the magnets proper i.e. so that there will be a flux path through structural steel 10, and the magnets are held in place by non-magnetic means, for instance bolts 32 having insulative sleeves 34 thereon. The bolts pass through openings in the sides of housing 14 and bar magnets 26 and 28 and hold the magnets in openings in wall 15 with the lower surfaces of the magnets flush with the lower surface of wall 15.

Small steel disks or soft iron disks 36 and 38 are coupled to the magnets 26 and 28. The disks provide a fast way of cleaning the small metal adhering particles i.e., by removing the disks from the magnets and having the particles fall off or easily brushed off the non-magnetized disks. They merely provide a flux path and need not and preferably are not magnetized. The disks 36 and 38 also furnish a good structural support and adhering elements for the housing 14 when applied to a magnetizable member such as a post, beam, or any other metal used in or about construction. Each disk has an undercut 40 between its upper and lower surface, and the upper surface is fitted flush against the lower surface of wall 15. The undercut creates a land 42 for the clips 44 which are offset members secured to wall 15 and fitting against land 42.

In place of bar magnets 26 and 28, bar magnet assembly *24a* (FIGURE 8) may be used. The bar magnet assembly *24a* is composed of a bar magnet *26a* provided with means to improve the flux path as shown by the arrows and by the north-south designations. A soft iron, essentially U-shaped casing 50 is secured to the bar magnet, for example by screw 52. The sides of the casing fit alongside of but are slightly spaced from the sides of bar magnet *26a*. Two iron bars 54 and 56 are at the lower edges of the sides of case 50, and these are spaced apart by means of a non-magnetizable panel 58, which may be plastic, for instance with the bars 56 and 54 cemented thereto. Assembly *24a* provides for a soft iron conductor for the flux lines of one pole, while the flux line from the other pole can flow directly toward the workpiece. Assembly *24a* may be used in place of the bar magnets 26 and 28 shown in FIGURE 2 or in place of the bar magnets of the chalk line 60 in FIGURES 4–7 and may be secured in place in the same manner as magnets 26 and 28 shown in FIGURE 2.

Chalk line 60 may be an ordinary and conventional chalk line structure including a housing 62 and a flexible elongate element 64 extending therefrom. The member 66 at the outer extremity of the chalk line may be equipped with a magnet 68, and the same holds true for the end of tape 18 (shown in FIGURE 1). The holding means for the magnet are the same for the tape and the chalk line. They merely consist of a clamp 70 including a screw 72 extending through hole 73 of the clamp and engaged with two sides of the wire member 66. The small channels at the end of the clamp will enable engagement with the sides of elements 66. Screw 72 is threaded into a tapped opening 75 of magnet 68 thereby holding the entire assembly fastened in place on an element such as element 66.

Figure 5:
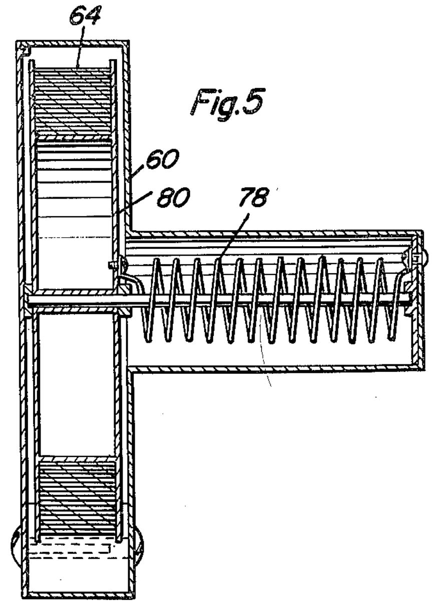
FIGURE 5 is a sectional view taken on the line 5—5 of FIGURE 4.
Figure 7:
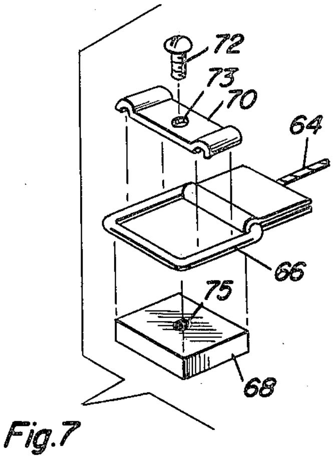
FIGURE 7 is an exploded perspective view showing the parts of a magnet holder assembly applied to the end of the chalk line.

The chalk line itself being conventional, will usually be of the spring return type and therefore spring 78 is shown in FIGURE 5. The line 64 is mounted on a drum 80, and the drum is spring opposed in its rotary movement in one direction.

An important feature, as far as the invention is concerned is in the magnets disposed within case or housing 60 and the members 36 and 38 which are attached by means of clips or clamps 44 to the bottom of the housing or case. The magnets for the chalk line and the members 36 and 38 are identical to those described in connection with the tape.

Functionally, the housing or the end of the elongate element regardless of whether it is a tape or a line, may be fastened in place by magnetic attraction. Then all the person using the device has to do is to move his desired length and obtain a measurement or operate the chalk line. Then by a quick snap of his wrist, the magnetically held portion of the tape or chalk line is separated from the metal support e.g. steel 10, and the chalk line or tape is restored to the non-operative position. This requires the services of only one man.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A holder for a chalk line and measuring tape wherein they include a flexible elongate element and a housing within which the elongate element is retractile, a magnetic holder secured to said housing and including a magnet connected with said housing, a magnetizable member magnetically secured to said housing and contacting the magnet and providing a flux path for the magnet and also a mechanical seat to be attached to a metallic object, the magnetic securement of said member enabling removal thereof from the magnet to facilitate cleaning metal particles therefrom.

2. The subject matter of claim 1 wherein said member includes a seat, and clip means engaging said seat and attached to said housing for holding said member on said housing.

3. A holder for a chalk line and measuring tape wherein they include a flexible elongate element and a housing within which the elongate element is retractile, a magnetic holder secured to said housing and including a magnet connected with said housing, a magnetizable member secured to said magnet and providing a flux path for the magnet and also a mechanical seat to be attached to a metallic object, and said magnet having a flux path enhancing case attached thereto and provided with sides along the sides of the magnet.

4. In combination with a flexible member, a housing having an opening therein, a reel within the housing for winding and unwinding of the flexible member thereon, a holder for said housing, said holder including a pair of bar magnets, said housing having a bottom and spaced parallel side walls, said bottom having a pair of openings therein each receiving a portion of the associated magnet, means extending through the walls of the housing and the magnets for retaining the magnets in place, a pair of clips disposed diametrically of each of said openings, a magnetizable seat member forming a closure for each of the openings and in contacting engagement with the magnets, said seat including a peripheral recess for engagement by the clips for readily detachable mounting of the seats whereby the seats may be easily moved by lateral sliding movement in relation to the magnets thereby removing the seats for easy removal of magnetizable particles thereon for cleaning the seats.

5. In combination with a flexible member, a housing having an opening therein, a reel within the housing for winding and unwinding of the flexible member thereon, a holder for said housing, said holder including a pair of bar magnets, said housing having a bottom and spaced parallel side walls, said bottom having a pair of openings therein each receiving a portion of the associated magnet, a pair of clips disposed diametrically of each of said openings, a magnetizable seat member forming a closure for each of the openings and in contacting engagement with the magnets, said seat including a peripheral recess for engagement by the clips for readily detachable mounting of the seats whereby the seats may be easily moved by lateral sliding movement in relation to the magnets thereby removing the seats for easy removal of magnetizable particles thereon for cleaning the seats, each of said magnets including a generally U-shaped flux path member extending across the top and down two side edges thereof for providing a path for the flux from one of the poles of the magnet whereby both poles of the magnet may be employed for holding the housing in place.

References Cited in the file of this patent

UNITED STATES PATENTS

| | | |
|---|---|---|
| 2,663,941 | Dart | Dec. 29, 1953 |
| 2,704,890 | Welsch | Mar. 29, 1955 |
| 2,792,186 | Sadowsky | May 14, 1957 |
| 2,947,507 | Schlage et al. | Aug. 2, 1960 |